United States Patent
Kim et al.

(10) Patent No.: US 9,886,167 B2
(45) Date of Patent: Feb. 6, 2018

(54) DISPLAY APPARATUS AND CONTROL METHOD THEREOF

(71) Applicant: Samsung Electronics Co. Ltd., Suwon-si, Gyeonggi-do (KR)

(72) Inventors: Hye-Jin Kim, Suwon-si (KR); Ji-Young Yun, Incheon (KR); Jin-Min Chung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 14/044,389

(22) Filed: Oct. 2, 2013

(65) Prior Publication Data

US 2014/0292818 A1 Oct. 2, 2014

(30) Foreign Application Priority Data

Mar. 26, 2013 (KR) ........................ 10-2013-0032034

(51) Int. Cl.
| | |
|---|---|
| *G06F 3/0482* | (2013.01) |
| *G06F 3/0484* | (2013.01) |
| *G06F 3/0488* | (2013.01) |
| *G06F 9/44* | (2006.01) |

(52) U.S. Cl.
CPC ........ *G06F 3/0482* (2013.01); *G06F 3/04883* (2013.01); *G06F 9/4443* (2013.01)

(58) Field of Classification Search
CPC ...... G06F 1/1626; G06F 3/016; G06F 3/0488; G06F 3/0202; G06F 3/04817; G06F 3/0484; G06F 3/041; G06F 2203/04808; G06F 3/0481; G09G 2340/145

USPC ....... 345/169, 168, 173, 156, 649, 650, 659, 345/619, 672, 676, 680, 684, 474, 678, 345/681; 715/243, 788, 783, 799, 863, 715/864, 866, 249, 253, 763–765, 835, 715/840

See application file for complete search history.

(56) References Cited

U.S. PATENT DOCUMENTS

| | | | |
|---|---|---|---|
| 8,139,026 B2 | 3/2012 | Griffin | |
| 9,201,467 B2* | 12/2015 | Fujii | G06T 19/20 |
| 2007/0146352 A1* | 6/2007 | Kim et al. | 345/184 |
| 2008/0119237 A1* | 5/2008 | Kim | 455/566 |
| 2009/0058821 A1* | 3/2009 | Chaudhri et al. | 345/173 |
| 2009/0183098 A1* | 7/2009 | Casparian et al. | 715/765 |
| 2011/0059775 A1* | 3/2011 | Choi et al. | 345/173 |
| 2011/0169868 A1* | 7/2011 | Amemiya | G06F 1/1626 345/676 |
| 2011/0197164 A1* | 8/2011 | Ahn | G06F 3/0488 715/835 |
| 2012/0169646 A1* | 7/2012 | Berkes et al. | 345/174 |

(Continued)

FOREIGN PATENT DOCUMENTS

KR 10-2011-0018589 A 2/2011

*Primary Examiner* — Chante Harrison
(74) *Attorney, Agent, or Firm* — Jefferson IP Law, LLP

(57) ABSTRACT

A display apparatus which executes an application including at least one object and a control method thereof are provided. The control method includes displaying an application execution screen including the at least one object, receiving, as an input, an object position change command including at least one of a position change direction and a position change amount, and displaying the application execution screen including the first object, the position of which has been changed according to the object position change command.

6 Claims, 16 Drawing Sheets

(56) References Cited

U.S. PATENT DOCUMENTS

| | | | |
|---|---|---|---|
| 2012/0188243 A1* | 7/2012 | Fujii | G06T 19/20 345/659 |
| 2013/0002565 A1* | 1/2013 | Tumanov et al. | 345/173 |
| 2013/0019192 A1* | 1/2013 | Itoh | G06F 3/0346 715/765 |
| 2013/0091462 A1* | 4/2013 | Gray | G06F 3/0346 715/810 |
| 2013/0111384 A1* | 5/2013 | Kim | G06F 3/048 715/765 |
| 2013/0120464 A1* | 5/2013 | Wei | G06F 3/04842 345/672 |
| 2013/0234948 A1* | 9/2013 | Jian | 345/169 |
| 2013/0307783 A1* | 11/2013 | Park et al. | 345/169 |
| 2014/0019910 A1* | 1/2014 | Kim | G06F 3/04817 715/810 |
| 2014/0189551 A1* | 7/2014 | Kim | G06F 3/04817 715/765 |
| 2014/0295931 A1* | 10/2014 | Ng | G06F 3/0488 715/863 |
| 2014/0320420 A1* | 10/2014 | Ida | G06F 3/044 345/173 |
| 2015/0007069 A1* | 1/2015 | Huang | G06F 3/04817 715/763 |
| 2015/0116363 A1* | 4/2015 | Monte | G06T 3/60 345/659 |
| 2015/0199110 A1* | 7/2015 | Nakazato | G06F 3/0487 715/763 |

* cited by examiner

DISPLAY APPARATUS AND CONTROL METHOD THEREOF

PRIORITY

This application claims the benefit under 35 U.S.C. §119(a) of a Korean patent application filed on Mar. 26, 2013 in the Korean Intellectual Property Office and assigned Serial No. 10-2013-0032034, the entire disclosure of which is hereby incorporated by reference.

BACKGROUND OF THE INVENTION

1. Field of the Invention

The present invention relates generally to a display apparatus and a control method thereof. More particularly, the present invention relates to a display apparatus for controlling the display of a window in which an application is executed, and a control method thereof.

2. Description of the Related Art

A desktop computer has at least one display apparatus (e.g., a monitor). A mobile device (e.g., a mobile phone, a smart phone, or a tablet Personal Computer (PC)) using a touch screen typically has a single display apparatus.

A user of a desktop computer can divide a screen of a display apparatus (e.g., a horizontal division or a vertical division in a case where the user performs a task while multiple windows are being displayed on the screen) according to working conditions, and can independently use each of the divided screens. When a web browser is executed, the user can move in an upward direction or in a downward direction of web pages by using a page up button or a page down button included in a keyboard. When a mouse is used instead of the keyboard, the user can select a scroll bar at a side part of a web page by using a cursor of the mouse, and can move in an upward direction or in a downward direction of web pages. Also, the user can select a "back to top" button which is represented by text or an icon and is located at a lower part of a web page, and can move to the uppermost part of the web page.

A mobile device has a smaller size of a displayed screen and receives more limited input than does a desktop computer. The mobile device has difficulty in dividing a screen thereof and using the divided screens.

Also, on each mobile device, it is possible to execute various applications, such as basic applications which are manufactured by a manufacturer of the mobile device or according to the manufacturer's specifications and are installed in the mobile device prior to the device entering service, and additional applications downloaded from a site for selling or freely providing applications on the Internet. The additional applications can be developed by general users, and can be registered at the site for selling applications. Accordingly, anyone can freely sell applications, which he or she has developed, to a user of each mobile device at the site for selling applications. Accordingly, currently, according to the type of mobile device, tens of thousands to hundreds of thousands of applications are available for the mobile device, free of charge or with charge.

As described above, various applications which excite the curiosity of consumers, improve and enrich consumer's lives, and meet the consumers' needs, are provided for the mobile devices. However, each mobile device is manufactured in a portable size, and thus has limitations on the size of a display unit thereof and a User Interface (UI) thereof.

Meanwhile, recently, a display apparatus includes a touch screen of a relatively large size in order to allow the user to easily view a screen thereof. Particularly, when the user grasps the display apparatus with one hand and operates it, he or she may have difficulty in touching a particular part if the touch screen is of a relatively large size. For example, the touch screen can display a particular object on a right part thereof. In this case, when the user holds and operates the display apparatus with his or her left hand, he or she may have difficulty in touching the particular object displayed on the right part of the touch screen. Therefore, a need has been observed for developing a display apparatus that the user can more easily operate with one hand, and a control method thereof.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a display apparatus capable of easily changing a position of an object on a touch screen, and a control method thereof.

In accordance with an aspect of the present invention, a control method of a display apparatus which executes an application including at least one object is provided. The method includes displaying an application execution screen including the at least one object, receiving, as an input, an object position change command which causes a position of a first object with respect to the at least one object to be changed and includes at least one of a position change direction and a position change degree, and displaying the application execution screen including the first object, the position of which has been changed based on the object position change command.

In accordance with another aspect of the present invention, a display apparatus which executes an application including at least one object is provided. The display apparatus includes a touch screen for displaying an application execution screen including the at least one object, a sensor module for sensing an object position change command including at least one of a position change direction and a position change degree, and a controller for performing a control operation for displaying the application execution screen including the first object, the position of which has been changed based on the object position change command.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
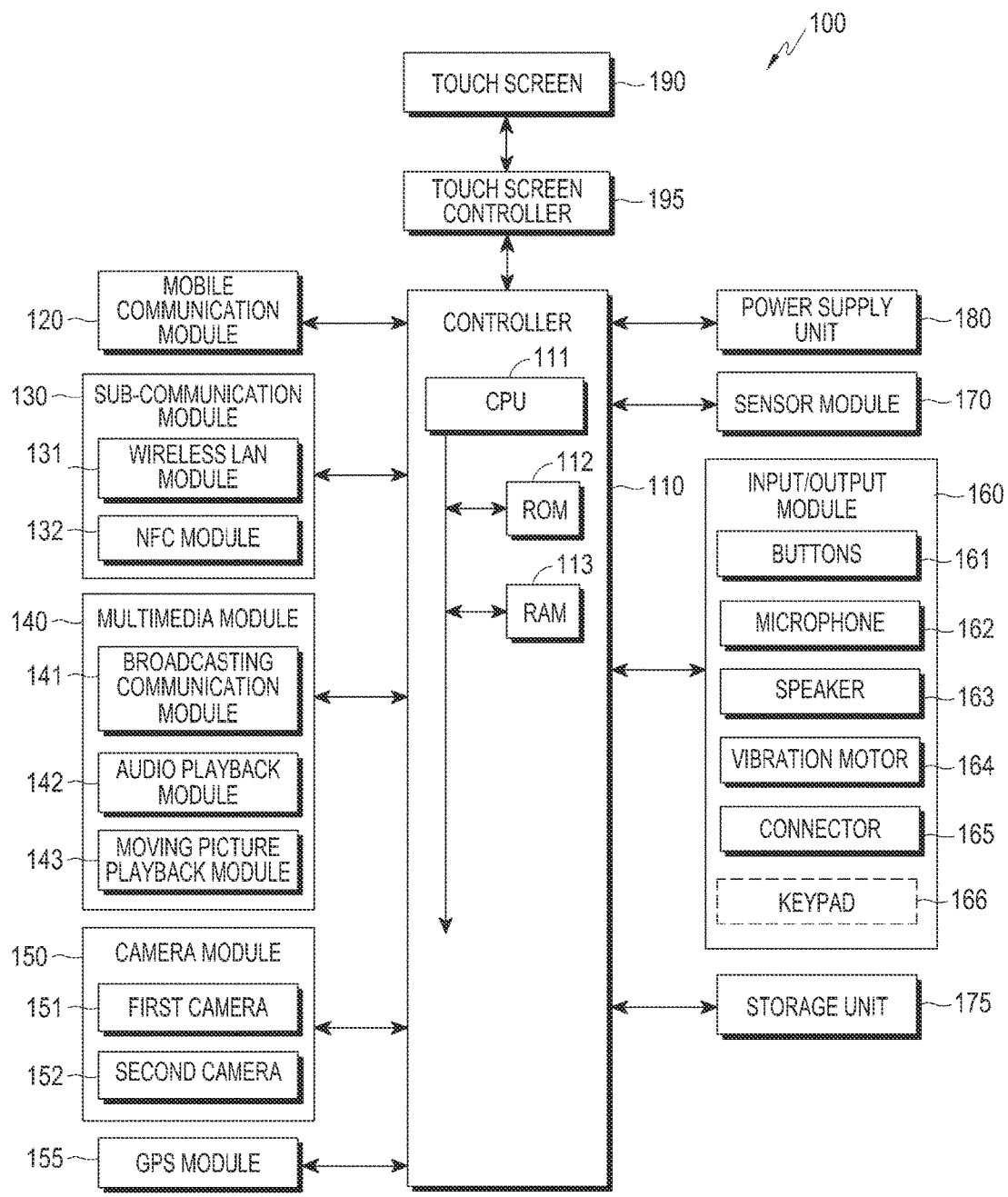
FIG. 1 is a block diagram illustrating a configuration of a display apparatus according to an exemplary embodiment of the present invention.

FIG. 1 is a block diagram schematically illustrating a configuration of a display apparatus according to an exemplary embodiment of the present invention.

Referring to FIG. 1, the display apparatus 100 includes a controller 110, a mobile communication module 120, a sub-communication module 130, a multimedia module 140, a camera module 150, a Global Positioning System (GPS) module 155, an input/output module 160, a sensor module 170, a storage unit 175, a power supply unit 180, a touch screen 190, and a touch screen controller 195.

According to exemplary embodiments of the present invention, a display apparatus 100 may be connected to an external device (not shown) by using a mobile communication module 120, a sub-communication module 130 and a connector 165. The external devices (not shown) may include, for example, another device, a mobile phone, a smart phone, a tablet Personal Computer (PC), and a server.

According to an exemplary embodiment of the present invention, the sub-communication module 130 includes at least one of a wireless Local Area Network (LAN) module 131 and a short-range communication module 132 (e.g., a Near Field Communication (NFC) module). For example, the sub-communication module 130 may include only the wireless LAN module 131, or may include only the short-range communication module 132, or may include both the wireless LAN module 131 and the short-range communication module 132.

According to an exemplary embodiment of the present invention, the multimedia module 140 includes at least one of a broadcasting communication module 141, an audio playback module 142, and a moving image playback module 143.

According to an exemplary embodiment of the present invention, the camera module 150 may include at least one of a first camera 151 and a second camera 152.

According to an exemplary embodiment of the present invention, the input/output module 160 includes at least one of buttons 161, a microphone 162, a speaker 163, a vibration motor 164, the connector 165, and a keypad 166.

The controller 110 may include a Central Processing Unit (CPU) 111, a Read-Only Memory (ROM) 112 which stores at least a control program for controlling the display apparatus 100, and a Random Access Memory (RAM) 113 which stores a signal or data received from the outside of the display apparatus 100, or which is used as a memory area for a task performed by the display apparatus 100. The CPU 111 may include multiple processors. For example, the CPU 111 may include a single-core processor, a dual-core processor, a triple-core processor, a quad-core processor, or the like. The CPU 111, the ROM 112 and the RAM 113 may be interconnected by an internal bus.

The controller 110 may control the mobile communication module 120, the sub-communication module 130, the multimedia module 140, the camera module 150, the GPS module 155, the input/output module 160, the sensor module 170, the storage unit 175, the power supply unit 180, the touch screen 190, and the touch screen controller 195.

According to the control of the controller 110, the mobile communication module 120 allows the display apparatus 100 to be connected to an external device through mobile communication by using at least one antenna (not shown). The mobile communication module 120 transmits and receives a wireless signal for a voice call, a video call, a Short Message Service (SMS), a Multimedia Messaging Service (MMS), or the like to/from a mobile phone (not shown), a smart phone (not shown), a tablet PC, or another device (not shown) which has contact information which is input to the display apparatus 100.

According to the control of the controller 110, the wireless LAN module 131 may be connected to the Internet at a place where a wireless Access Point (AP) (not shown) is available. The wireless LAN module 131 supports a wireless LAN standard (e.g., Institute of Electrical and Electronics Engineers (IEEE) 802.11x). According to the control of the controller 110, the short-range communication module 132 enables the display apparatus 100 to perform short-range wireless communication with an image forming device (not shown). Short-range communication schemes may include, for example, Bluetooth, Infrared Data Association (IrDA), Zigbee, and the like.

According to the performance of the display apparatus 100, the display apparatus 100 may include at least one of the mobile communication module 120, the wireless LAN module 131 and the short-range communication module 132. For example, according to the performance of the display apparatus 100, the display apparatus 100 may include a combination of the mobile communication module 120, the wireless LAN module 131 and the short-range communication module 132.

The multimedia module 140 may include the broadcasting communication module 141, the audio reproduction module 142, or a moving image reproduction module 143. According to the control of the controller 110, the broadcasting communication module 141 may receive a broadcast signal (e.g., a TeleVision (TV) broadcast signal, a radio broadcast signal, a data broadcast signal, and the like) and broadcast additional information (e.g., an Electronic Program Guide (EPG) or an Electronic Service Guide (ESG)), which are transmitted by a broadcast station through a broadcast communication antenna (not shown). According to the control of the controller 110, the audio playback module 142 may reproduce a stored or received digital audio file (e.g., a file having a file extension of .mp3, .wma, .ogg, or .wav). According to the control of the controller 110, the moving image playback module 143 may reproduce a stored or received digital moving image file (e.g., a file having a file extension of .mpeg, .mpg, .mp4, .avi, .mov, or .mkv). The moving image playback module 143 may also reproduce a digital audio file.

The multimedia module 140 may include the audio playback module 142 and the moving image playback module 143, except for the broadcasting communication module 141. Also, the audio playback module 142 or the moving image playback module 143 of the multimedia module 140 may be included in the controller 110.

The camera module 150 may include at least one of the first camera 151 and the second camera 152, each camera for capturing a still image or a moving image according to the control of the controller 110. Also, the first camera 151 or the second camera 152 may include an auxiliary light source, such as a flash (not shown), which provides an amount of light required to capture an image. The first camera 151 may be mounted on a front surface of the display apparatus 100, and the second camera 152 may be mounted on a rear surface of the display apparatus 100. Otherwise, the first camera 151 and the second camera 152 may be disposed in such a manner as to be adjacent to each other (e.g., a distance between the first camera 151 and the second camera 152 is greater than 1 cm and is less than 8 cm), and may capture a three-dimensional still image or a three-dimensional moving image.

The GPS module 155 may receive a signal (e.g., a radio wave) from each of multiple GPS satellites (not shown) in the Earth's orbit, and may calculate a location of the display apparatus 100 by using a Time of Arrival (TOA) from each of the GPS satellites (not shown) to the display apparatus 100.

The input/output module 160 may include at least one of the multiple buttons 161, the microphone 162, the speaker 163, the vibration motor 164, the connector 165, and the keypad 166.

The buttons 161 may be formed on a front surface, a lateral surface, or a rear surface of a housing of the display apparatus 100, and may include at least one of a power/lock button (not shown), a volume button (not shown), a menu button, a home button, a back button, and a search button.

According to the control of the controller 110, the microphone 162 may receive a voice or sound as input, and may generate an electrical signal.

According to the control of the controller 110, the speaker 163 may output sounds matched to various signals (e.g., a wireless signal, a broadcast signal, a digital audio file, a digital moving image file, and photographing) from the mobile communication module 120, the sub-communication module 130, the multimedia module 140, and the camera module 150, to the outside of the display apparatus 100. The speaker 163 may output a sound (e.g., a button operation sound or a ringback tone matched to a telephone call) matched to a function that the display apparatus 100 performs. The display apparatus 100 may include multiple speakers. The speaker 163 or multiple speakers may be disposed at an appropriate position or positions of the housing of the display apparatus 100.

According to the control of the controller 110, the vibration motor 164 may convert an electrical signal into a mechanical vibration. For example, when the display apparatus 100 in a vibration mode receives a voice call from another device (not shown), the vibration motor 164 of the display apparatus 100 operates. The display apparatus 100 may include multiple vibration motors. The vibration motor 164 or multiple vibration motors may be mounted within the housing of the display apparatus 100. The vibration motor 164 may operate in response to a touch action of a user who touches the touch screen 190 and a continuous movement of a touch on the touch screen 190.

The connector 165 may be used as an interface for connecting the display apparatus 100 to an external device (not shown) or a power source (not shown). According to the control of the controller 110, through a wired cable connected to the connector 165, the display apparatus 100 may transmit data stored in the storage unit 175 of the display apparatus 100 to an external device (not shown) or may receive data from the external device (not shown). Also, through the wired cable connected to the connector 165, the display apparatus 100 may be supplied with power from the power source (not shown) or may charge a battery (not shown) by using the power source.

The keypad 166 may receive key input from the user in order to control the display apparatus 100. The keypad 166 includes a physical keypad (not shown) installed on the front surface of the display apparatus 100 or a virtual keypad (not shown) displayed on the touch screen 190. The physical keypad installed on the front surface of the display apparatus 100 may be excluded according to the performance or structure of the display apparatus 100.

The sensor module 170 includes at least one sensor for detecting the state of the display apparatus 100. For example, the sensor module 170 may include a proximity sensor for detecting whether the user is close to the display apparatus 100, an illuminance sensor (not shown) for detecting the amount of light around the display apparatus 100, a motion sensor (not shown) for detecting the motion of the display apparatus 100 (e.g., the rotation of the display apparatus 100, or acceleration or vibration applied to the display apparatus 100), and the like. At least one sensor may detect the state of the display apparatus 100, may generate a signal matched to the detection, and may transmit the generated signal to the controller 110. According to the performance of the display apparatus 100, sensors may be added to or removed from the sensor module 170.

According to the control of the controller 110, the storage unit 175 may store a signal or data which is input/output in response to an operation of each of the mobile communication module 120, the sub-communication module 130, the multimedia module 140, the camera module 150, the GPS module 155, the input/output module 160, the sensor module 170, and the touch screen 190. For example, the storage unit 175 may store any signal or data which is received or generated during the use of the display apparatus 100. The storage unit 175 may store a control program for controlling the display apparatus 100 or a control program for the controller 110, and executable applications.

The term "storage unit" includes the storage unit 175, the ROM 112 and the RAM 113 within the controller 110, or a memory card (not shown), such as a Secure Digital (SD) card or a memory stick removably mounted on the display apparatus 100. The storage unit may include a non-volatile memory, a volatile memory, a Hard Disk Drive (HDD), a Solid State Drive (SSD), and the like.

According to the control of the controller 110, the power supply unit 180 may supply power to one battery or multiple batteries (not shown) disposed in the display apparatus 100. The battery or batteries (not shown) supply power to the display apparatus 100. Also, the power supply unit 180 may supply power provided by an external power source (not shown) to the display apparatus 100 through a wired cable connected to the connector 165.

The touch screen 190 may provide the user with a user interface matched to various services (e.g., telephone call, data transmission, broadcasting, and photography). The touch screen 190 may transmit an analog signal matched to at least one touch, which is input to the user interface, to the touch screen controller 195. The touch screen 190 may receive at least one touch as input from the user's body (e.g., fingers, thumbs, and the like) or an input means (e.g., a stylus pen) enabling a touch. Also, the touch screen 190 may receive, as input, a continuous movement of one touch with respect to at least one touch. The touch screen 190 may receive any touch input of the related art, such as a tap, a double tap, a touch and hold, a touch and drag, a multi-touch, a swipe or flick, etc. The touch screen 190 may transmit an analog signal matched to a continuous movement of an input touch, to the touch screen controller 195.

According to exemplary embodiments of the present invention, a touch is not limited to the touch of the user's body or the input means enabling a touch on the touch screen 190, but may include a non-contact touch (e.g., a detectable distance between the touch screen 190 and the user's body or the input means enabling a touch is less than or equal to 1 mm) In the touch screen 190, a detectable distance may change depending on the performance or structure of the display apparatus 100.

The touch screen 190, for example, may be implemented as a resistive touch screen, a capacitive touch screen, an infrared touch screen, an acoustic wave touch screen, and the like.

The touch screen controller 195 converts an analog signal received from the touch screen 190 into a digital signal (e.g., X and Y coordinates), and provides the digital signal to the controller 110. The controller 110 may control the touch screen 190 by using the digital signal received from the touch screen controller 195. For example, in response to a touch input, the controller 110 may perform a control operation so as to select or execute a shortcut icon (not shown) displayed on the touch screen 190. Also, the touch screen controller 195 may be included in the controller 110.

Figure 2:
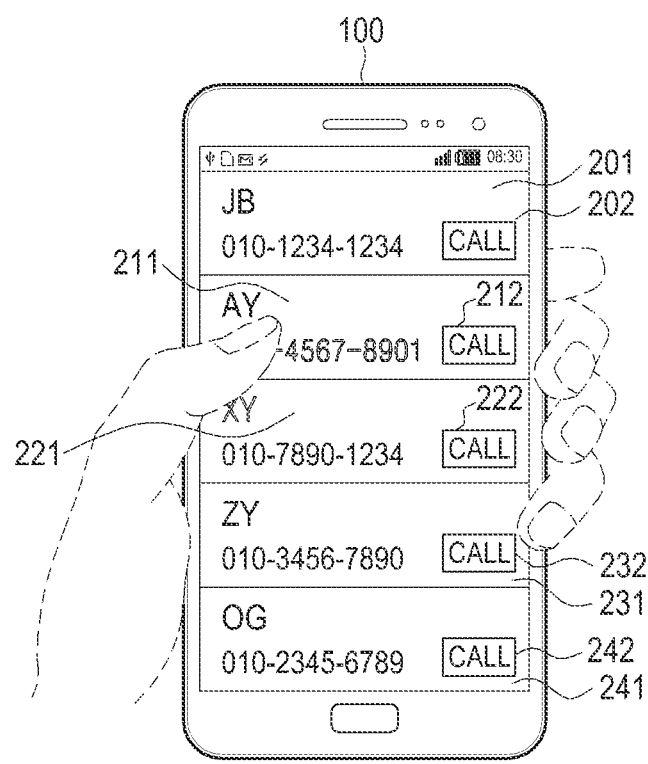
FIG. 2 is a view of a user grasping a display apparatus according to an exemplary embodiment of the present invention.

FIG. 2 is a view of a user grasping a display apparatus according to an exemplary embodiment of the present invention.

As illustrated in FIG. 2, the display apparatus 100 may execute an address book application. The address book application that the display apparatus 100 executes may include biographical information objects 201, 211, 221, 231 and 241, and dialing objects 202, 212, 222, 232 and 242. Objects may be implemented in various forms, such as text, a figure, an icon, a button, a checkbox, a photograph, a moving image, a web, and a map. When the user touches an object, a function or an event predetermined for the object may be performed in a relevant application. The object may be called a "view" according to an Operating System (OS). More specifically, when a touch gesture of the user is input to the touch screen 190, the controller 110 may identify coordinates of a position on the touch screen 190, at which the touch gesture has been input. The controller 110 may identify an object matched to the identified coordinates, and may perform a control operation for performing a function or an event predetermined for the relevant object.

For example, when a dialing object 202 is designated, the controller 110 may control a mobile communication module 120 to call 010-1234-1234, which is stored as a telephone number of a user named JB matched to the relevant object 202. Also, when the object 212, the object 222, the object 232 and the object 242 are designated, the controller 110 may perform a control operation for performing dialing matched to information of each of the identification code 211, the identification code 221, the identification code 231, and the identification code 241.

Meanwhile, a user may grasp the display apparatus 100 with the user's left hand. In this case, the user may designate each object as desired with the thumb of the user's left hand. However, when the touch screen 190 has a relatively large width, the user may have difficulty in touching the dialing objects 202 to 242.

Figure 3:
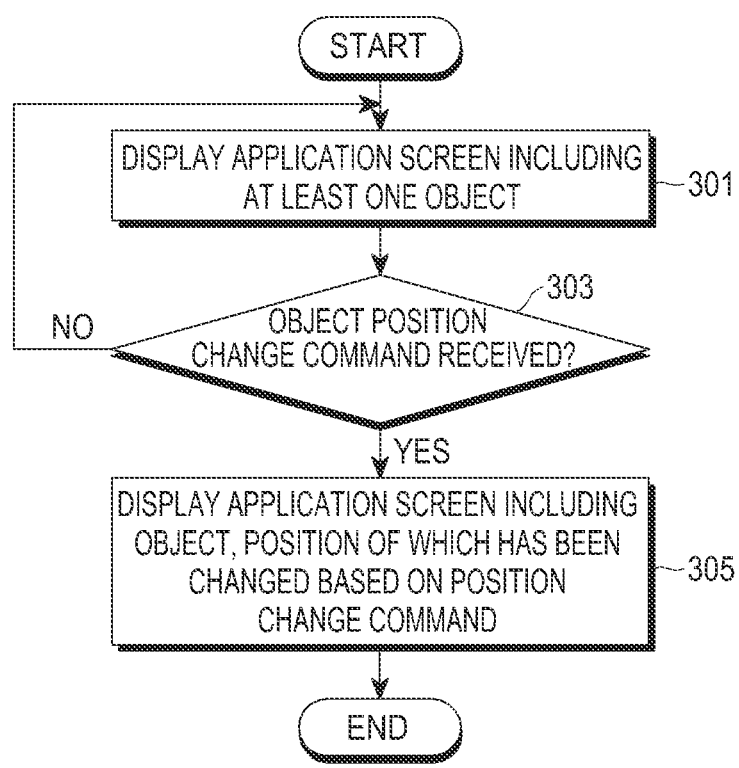
FIG. 3 is a flowchart illustrating a control method of a display apparatus according to an exemplary embodiment of the present invention.

FIG. 3 is a flowchart illustrating a control method of a display apparatus according to an exemplary embodiment of the present invention.

The display apparatus 100 may display an application screen including at least one object, in step 301. The display apparatus 100, for example, may display an address-book application screen including the dialing objects 202 to 242, as illustrated in FIG. 2.

The display apparatus 100 may receive, as input, an object position change command, in step 303. Here, the object position change command may include at least one of the designation of an object of a position change, a position change direction, and a position change amount.

The controller 110 may change a position of an object based on the input object position change command, and may perform a control operation for displaying an application screen including the object, the position of which has been changed, in step 305. For example, the controller 110 may analyze the object position change command, and thereby may determine which object is an object of a position change. The controller 110 may analyze the object position change command, and thereby may determine in which direction the object of the position change is to be moved before being displayed. The controller 110 may analyze the object position change command, and thereby may determine to what degree or amount the object of the position change is to be moved before being displayed.

Also, as described above, the object position change command may include at least one of the designation of an object of a position change, a position change direction, and a position change amount. Accordingly, the object position change command may include only a position change direction. For example, when the object position change command includes only a position change direction, the controller 110 may first identify an object defaulting to a position change. The controller 110 may also change a position of the relevant object to a default position in the position change direction.

When the object position change command includes both a position change direction and a position change degree, the controller 110 may first identify an object defaulting to a position change. The controller 110 may also change a position of the relevant object based on the position change direction and the position change amount, which have been input.

When the object position change command includes the designation of an object of a position change, a position change direction and a position change degree, the controller 110 may identify an object of a position change, and may change a position of the relevant object based on the position change direction and the position change amount, which have been input.

Meanwhile, those skilled in the art can easily understand that the object position change command may include a combination of various elements, besides the above-described elements, and that the controller 110 may change a position of an object in response to the combination of various elements.

Figure 4:
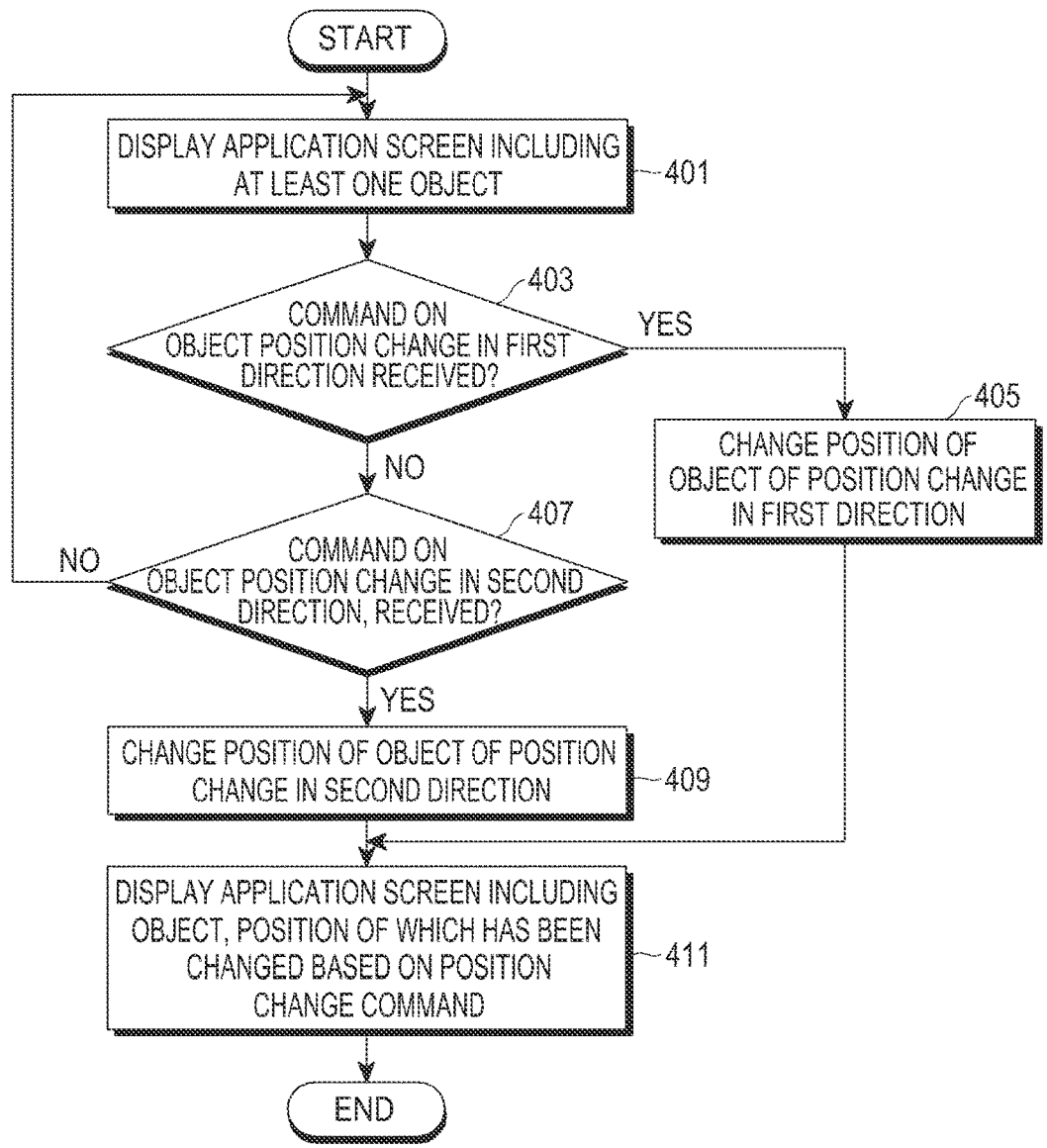
FIG. 4 is a flowchart illustrating a control method of a display apparatus according to an exemplary embodiment of the present invention.

FIG. 4 is a flowchart illustrating a control method of a display apparatus according to an exemplary embodiment of the present invention. Particularly, the control method illustrated in FIG. 4 corresponds to a case where an object position change command includes a position change direction. The control method illustrated in FIG. 4 will be described in more detail below with reference to FIGS. 5A to 5I. FIGS. 5A to 5I are views of a display apparatus according to exemplary embodiments of the present invention.

Figure 5A:
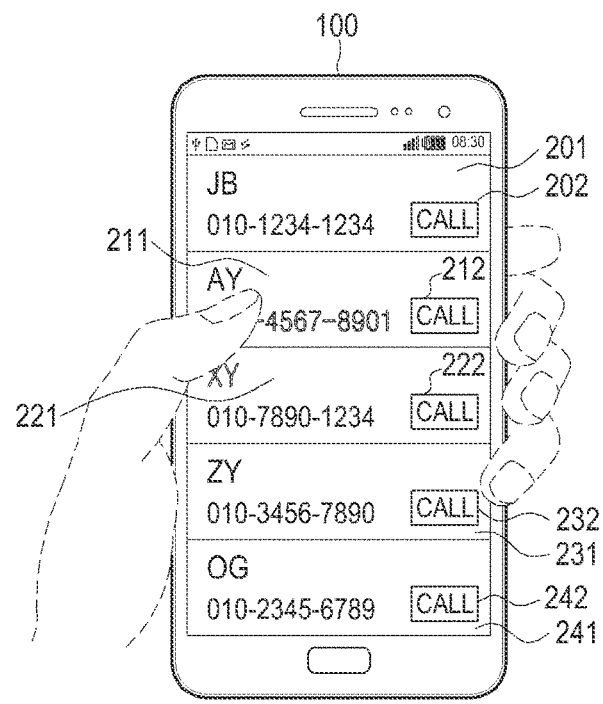
FIGS. 5A to 5I are views of a display apparatus according to exemplary embodiments of the present invention.

The display apparatus 100 may display an application screen including at least one object in step 401. For example, the display apparatus 100 may display an address-book application screen including the dialing objects 202 to 242, as illustrated in FIG. 5A.

Figure 5B:
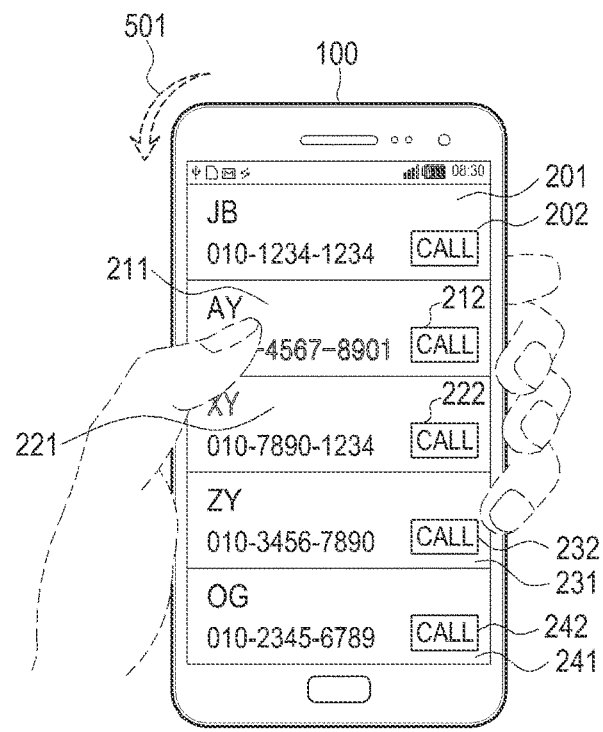

The display apparatus 100 may receive, as input, an object position change command, and may determine whether the object position change command corresponds to a position change in a first direction, in step 403. For example, the user may input an object position change command 501 corresponding to a position change in the left direction, as illustrated in FIG. 5B. For example, the object position change command 501 may be a tilting gesture in the left direction, a rotating gesture in the left direction, or a tab gesture in the left direction. Here, the tab gesture causes the display apparatus 100 to tilt in the left direction, and then, to tilt back to the original position. The sensor module 170 may sense the object position change command 501, and may output a sensing value to the controller 110.

When an object position change command corresponding to a position change in the first direction is input (i.e., 'Yes' from step 403), the controller 110 may identify an object defaulting to a position change. For example, an address book application illustrated in FIG. 5A enables an object of a position change to be set to each of the dialing objects 202 to 242. The controller 110 may identify that an object of a position change is each of the dialing objects 202 to 242.

Figure 5C:
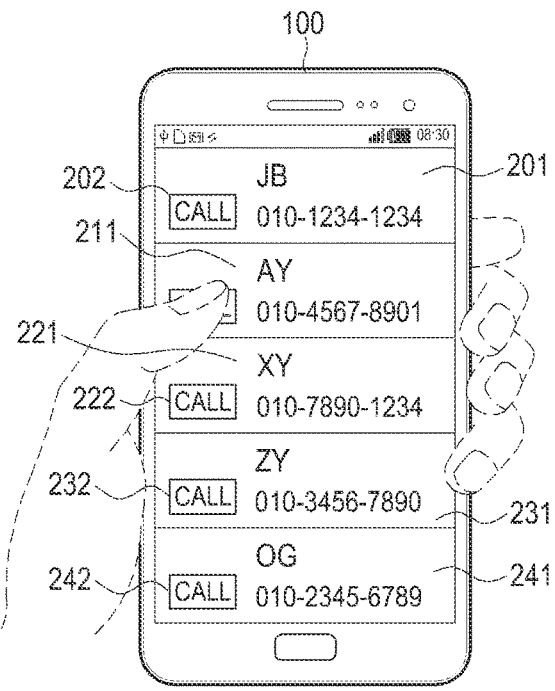

The controller 110 may change a position of the object of the position change in the first direction, in step 405. The controller 110 may display an application screen including the object, the position of which has been changed in the first direction, in step 411. For example, as illustrated in FIG. 5C, the controller 110 may display the dialing objects 202 to 242 in such a manner as to move the dialing objects 202 to 242 in the left direction. Also, the controller 110 may display an object which has been displayed in an area where each of the dialing objects 202 to 242 is currently displayed, in such a manner as to move the object relatively in the right direction. Specifically, the controller 110 may perform a control operation for displaying the dialing objects 202 to 242 in such a manner as to move the dialing objects 202 to 242 in the left direction. For example, when the object position change command corresponding to a position change in the left direction is input, the controller 110 may perform a control operation for displaying a layout in which the objects 202 to 242 of position changes are arranged at a left part of the relevant screen. Specifically, the address book application may include a first layout in which the dialing objects 202 to 242 are arranged at a right part of the relevant screen and a second layout in which the dialing objects 202 to 242 are arranged at a left part of the relevant screen. The controller 110 may perform a control operation for displaying one of the first layout and the second layout based on the input object position change command.

Figure 5D:
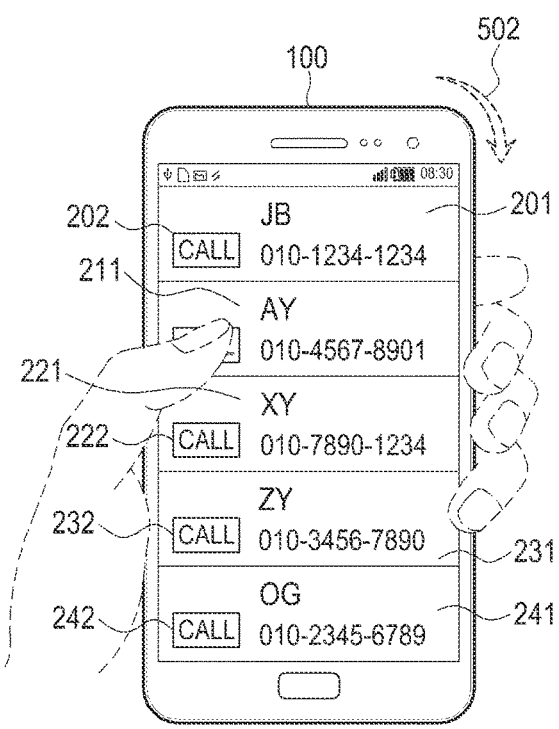

Referring again to FIG. 4, the controller 110 may receive, as input, an object position change command corresponding to a position change in a second direction, in step 407. For example, the user may input an object position change command 502 corresponding to a position change in the right direction, as illustrated in FIG. 5D. For example, the object position change command 502 may be a tilting gesture in the right direction, a rotating gesture in the right direction, or a tab gesture in the right direction.

When the object position change command corresponding to a position change in the second direction is input (i.e., 'Yes' from step 407), the controller 110 may change a position of an object of a position change in the second direction, in step 409. The controller 110 may perform a control operation for displaying an application screen including the object, the position of which has been changed in the second direction, in step 411.

Figure 5E:
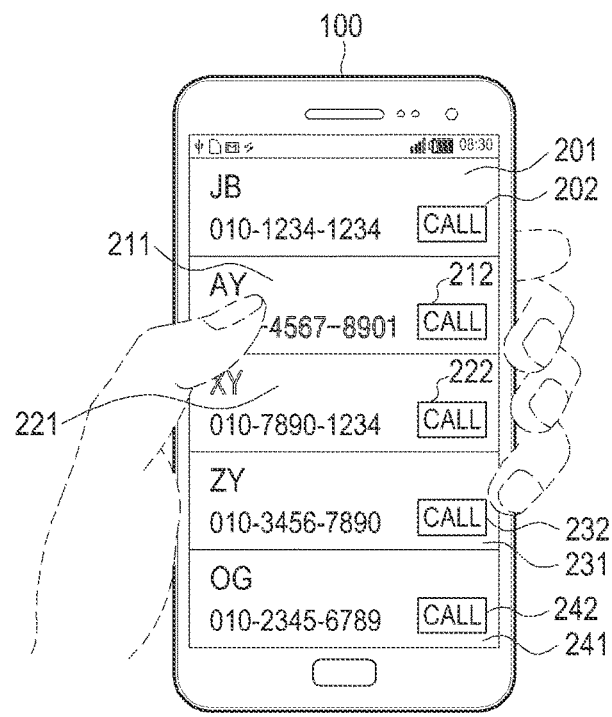

For example, as illustrated in FIG. 5E, the controller 110 may display the dialing objects 202 to 242 in such a manner as to move the dialing objects 202 to 242 in the right direction. Also, a controller 110 may display an object which has been displayed in an area where each of the dialing objects 202 to 242 is currently displayed, in such a manner as to move the object relatively in the left direction. Specifically, the controller 110 may perform a control operation for displaying the dialing objects 202 to 242 in such a manner as to move the dialing objects 202 to 242 in the right direction. For example, when the object position change command corresponding to a position change in the right direction is input, the controller 110 may perform a control operation for displaying a layout in which the objects 202 to 242 of position changes are arranged at a right part of the relevant screen.

Figure 5F:
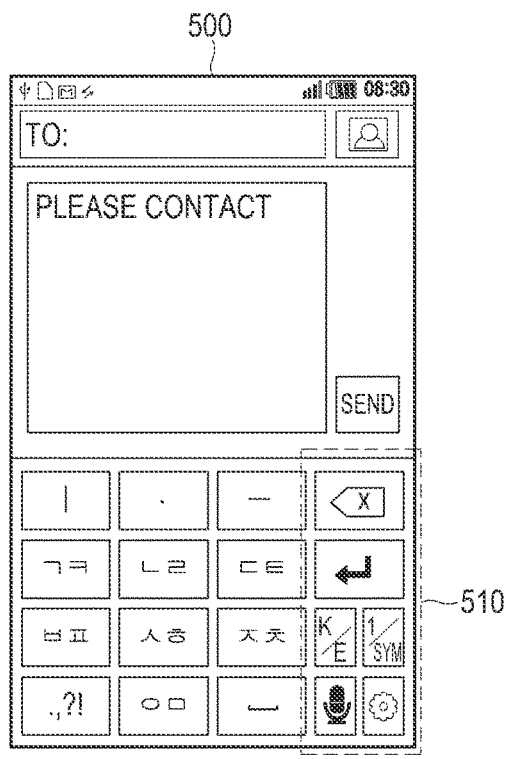
Figure 5G:
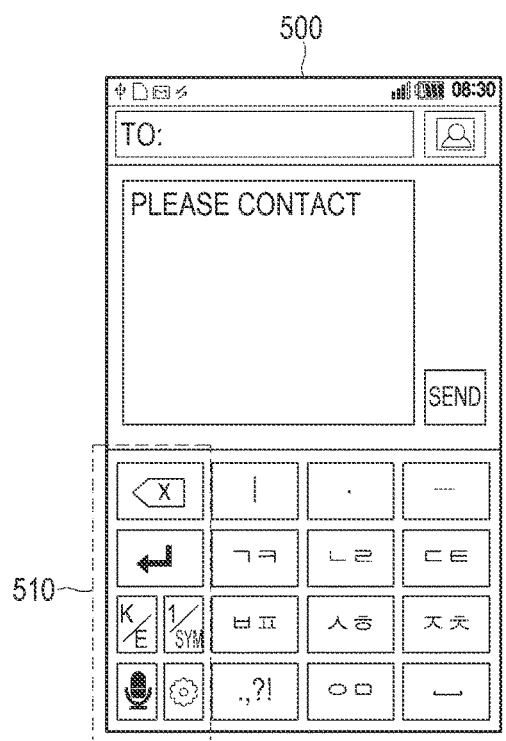

Meanwhile, FIGS. 5F and 5G are views of a display apparatus according to an exemplary embodiment of the present invention. Referring to FIG. 5F, an application screen 500 displayed by the display apparatus 100 includes multiple objects 510. The display apparatus 100 may receive, as input, an object position change command. As illustrated in FIG. 5G, the display apparatus 100 may display the multiple objects 510 in such a manner as to move the multiple objects 510 in the left direction in response to the received object position change command. As described above, the display apparatus 100 according to exemplary embodiments of the present invention may simultaneously change the positions of multiple objects, and is not limited to one object.

Figure 5H:
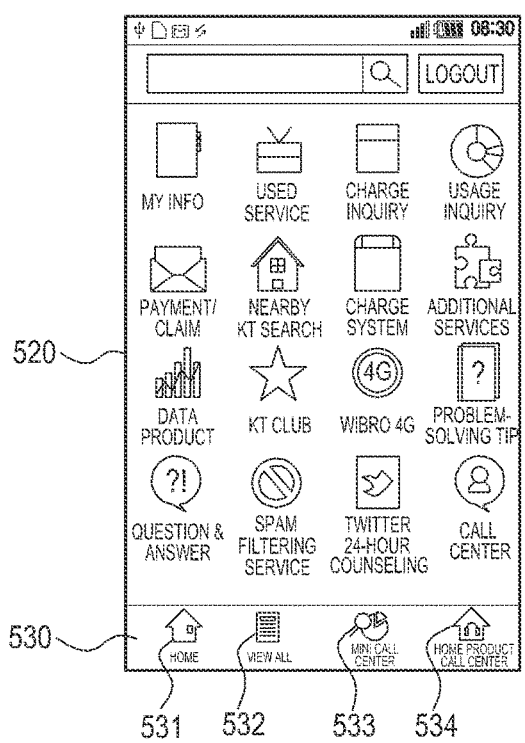
Figure 5I:
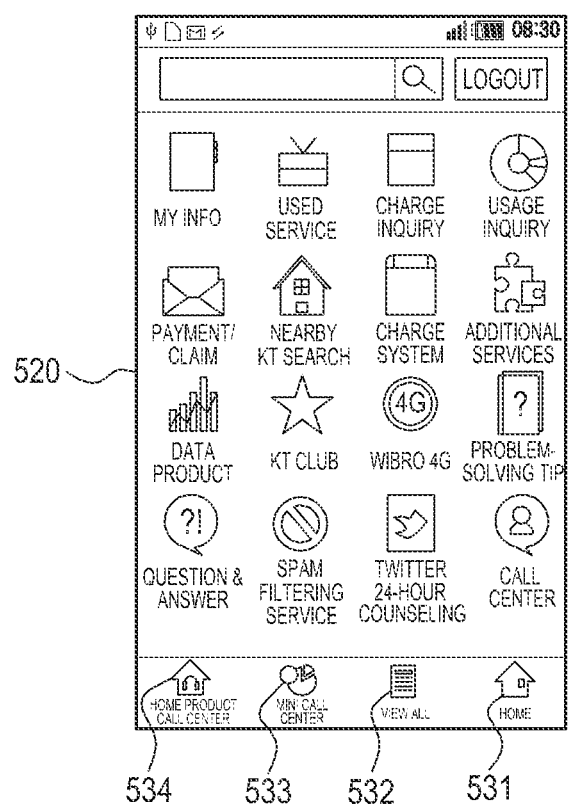

FIGS. 5H and 5I are views of a display apparatus according to an exemplary embodiment of the present invention. Referring to FIG. 5H, an application screen 520 displayed by the display apparatus 100 includes multiple objects 530. The multiple objects 530 may include a first object 531 to a fourth object 534. The display apparatus 100 may receive, as input, an object position change command. As illustrated in FIG. 5I, the display apparatus 100 may display the first object 531 to the fourth object 534 in such a manner as to invert an order of the first object 531 to the fourth object 534. Specifically, the display apparatus 100 may display the first object 531 to the fourth object 534, not in the order of the first object 531, the second object 532, the third object 533 and the fourth object 534, which is the display order in FIG. 5H, but instead in the order of the fourth object 534, the third object 533, the second object 532 and the first object 531. As described above, the display apparatus 100 according to exemplary embodiments of the present invention does not change a position of one object, but may display multiple objects in such a manner as to move the multiple objects and invert the initial positions of the multiple objects.

Figure 6:
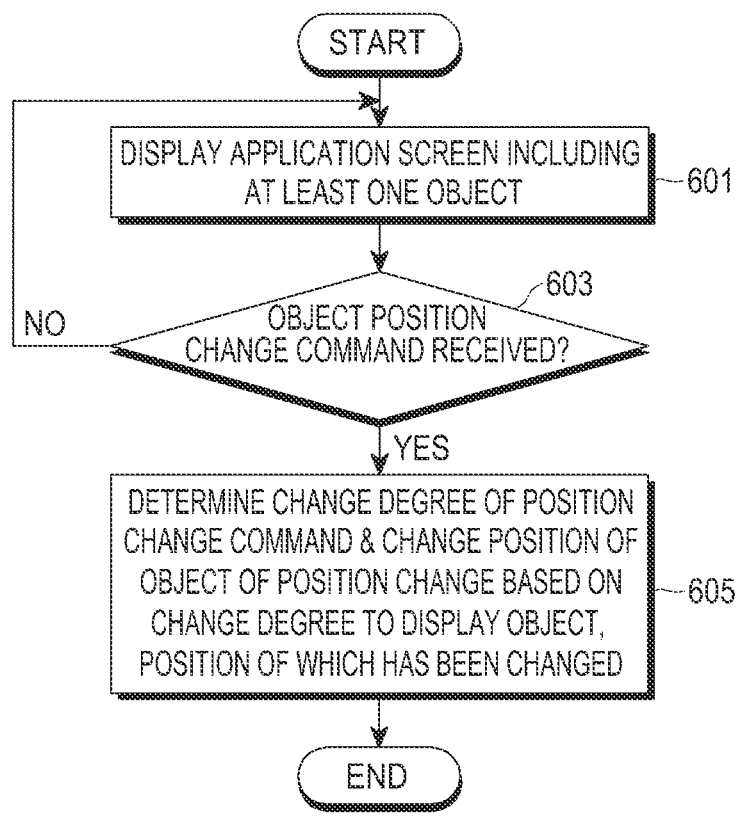
FIG. 6 is a flowchart illustrating a control method of a display apparatus according to an exemplary embodiment of the present invention.

FIG. 6 is a flowchart illustrating a control method of a display apparatus according to an exemplary embodiment of the present invention. Particularly, the control method illustrated in FIG. 6 corresponds to a case where an object position change command includes both a position change direction and a position change amount. The control method illustrated in FIG. 6 will be described in more detail below with reference to FIGS. 7A to 7G. FIGS. 7A to 7G are views of a display apparatus according to exemplary embodiments of the present invention.

Figure 7A:
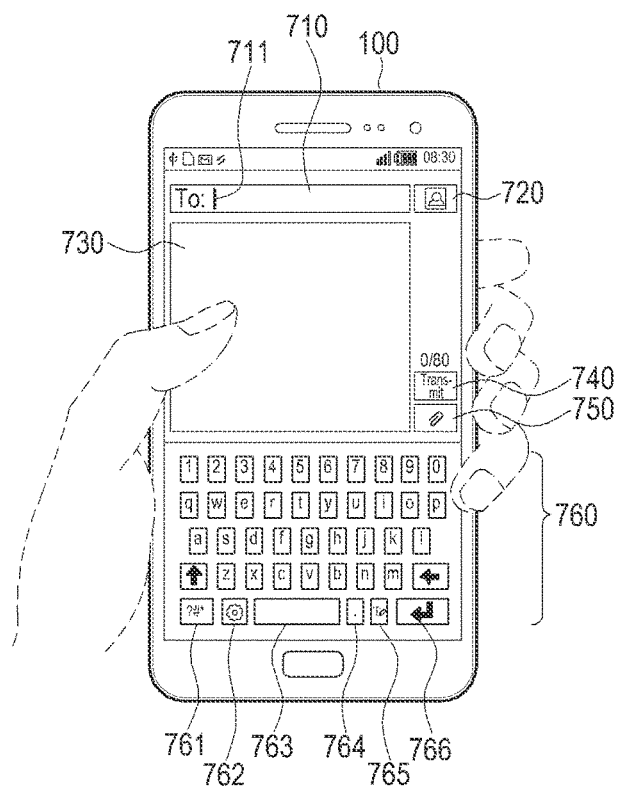
FIGS. 7A to 7H are views of a display apparatus according to exemplary embodiments of the present invention.

The display apparatus 100 may display an application screen including at least one object, in step 601. For example, the display apparatus 100 may display a text messaging application, as illustrated in FIG. 7A. The text messaging application may include a transmission number input window object 710, an address book access object 720, a message input window object 730, a transmit button object 740, an attached file access object 750, and a text input object 760. The transmission number input window object 710 may include a cursor 711 indicating an input position. Also, the text input object 760 may include first to sixth text input sub-objects 761 to 766 at a lower end part thereof. Here, the sixth text input sub-object 766, which in this example is an enter key, may be an object that the user frequently touches. However, the user may have difficulty in operating the text input sub-object 766 with a thumb of the user's left hand. The text messaging application enables the sixth text input sub-object 766 to be stored as a default object of a position change.

Figure 7B:
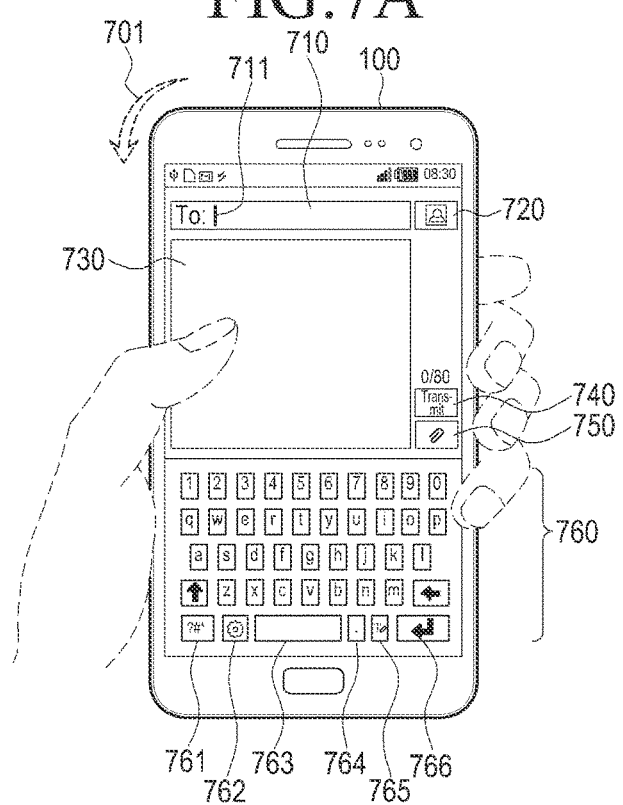

Referring again to FIG. 6, the display apparatus 100 may receive, as input, an object position change command. As illustrated in FIG. 7B, the display apparatus 100 may receive, as input, an object position change command 701 corresponding to a position change in the left direction. For example, the object position change command 701 may be a tilting gesture in the left direction, a rotating gesture in the left direction, or a tab gesture in the left direction. The sensor module 170 may sense the object position change command 701, and may output a sensing value to the controller 110.

When the object position change command is input (i.e., 'Yes' from step 603), the controller 110 may identify an object defaulting to a position change. For example, the text messaging application illustrated in FIG. 7A enables the sixth text input sub-object 766 to be stored as an object of a position change. The controller 110 may identify that an object of a position change is the sixth text input sub-object 766.

The controller 110 may change a position of the sixth text input sub-object 766 in the left direction. The controller 110 may also determine a position change degree or amount of the sixth text input sub-object 766. For example, the controller 110 may determine a position change degree based on at least one of information of an angular velocity, of an angular acceleration, and of the amount of angular change, which are received from the sensor module 170.

Figure 7C:
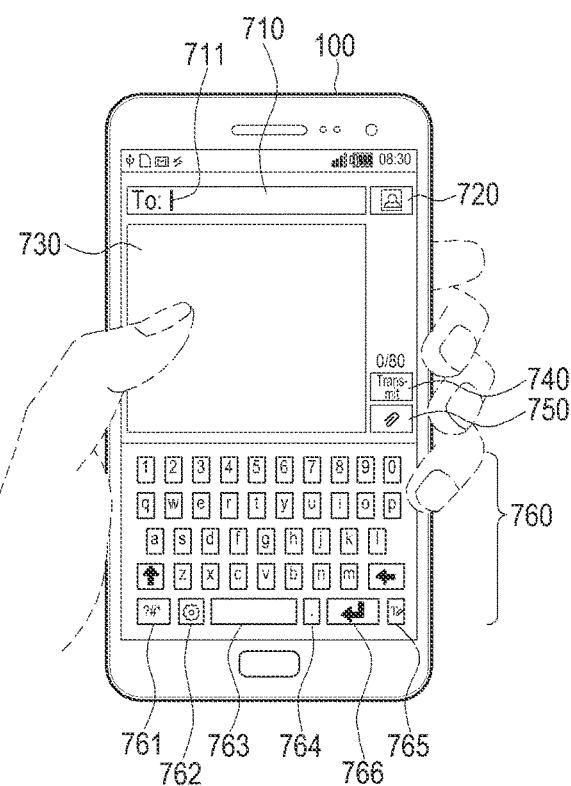

The controller 110 may display an application screen including an object, the position of which has been changed based on the determined position change degree or amount in the left direction, in step 605. For example, as illustrated in FIG. 7C, the controller 110 may display the sixth text input sub-object 766 in such a manner as to move the sixth text input sub-object 766 in the left direction. Also, the controller 110 may display a fifth text input sub-object 765 which has been displayed in an area where the sixth text input sub-object 766 is currently displayed, in such a manner as to move the fifth text input sub-object 765 relatively in the right direction. The controller 110 may determine that the position change degree corresponds to one step movement. Accordingly, the controller 110 may perform a control operation for displaying the sixth text input sub-object 766 and the fifth text input sub-object 765, in such a manner as to exchange the position of the sixth text input sub-object 766 for that of the fifth text input sub-object 765. Specifically, the controller 110 may perform a control operation for displaying the sixth text input sub-object 766 in such a manner as to move the sixth text input sub-object 766 one step in the left direction.

Figure 7D:
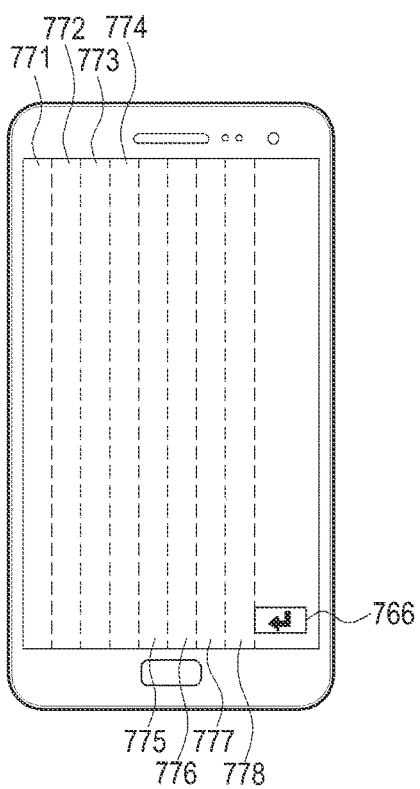

For example, when the object position change command corresponding to a position change in the left direction is input, the controller 110 may perform a control operation for displaying a layout in which an object of a position change is arranged at a left part of the relevant screen. More specifically, the controller 110 may perform a control operation for displaying a layout in which the object of the position change is arranged after moving the object of the position change by one step in the left direction. Specifically, a text messaging application may include a first layout in which the sixth text input sub-object 766 is arranged at a rightmost part of the relevant screen, and second to ninth layouts in each of which the sixth text input sub-object 766 is arranged on the screen after moving the sixth text input sub-object 766 by one step in the left direction with a previous layout as a reference starting from the first layout. For example, FIG. 7D is a conceptual view for explaining each step of moving an object of a position change according to an exemplary embodiment of the present invention. Referring to FIG. 7D, the controller 110 may perform a control operation for moving the object of the position change by one step at a time in the left direction (designated by reference numerals 771 to 778). The storage unit 175 may store, for example, the first to ninth layouts, in each of which the object of the position change is arranged after moving the object of the position change by one step in the left direction with a previous layout as a reference. The controller 110 may perform a control operation for displaying one of the first to ninth layouts based on the input object position change command. Of course, the number of nine layouts is given only as an example, and the present invention is not limited thereto.

Figure 7E:
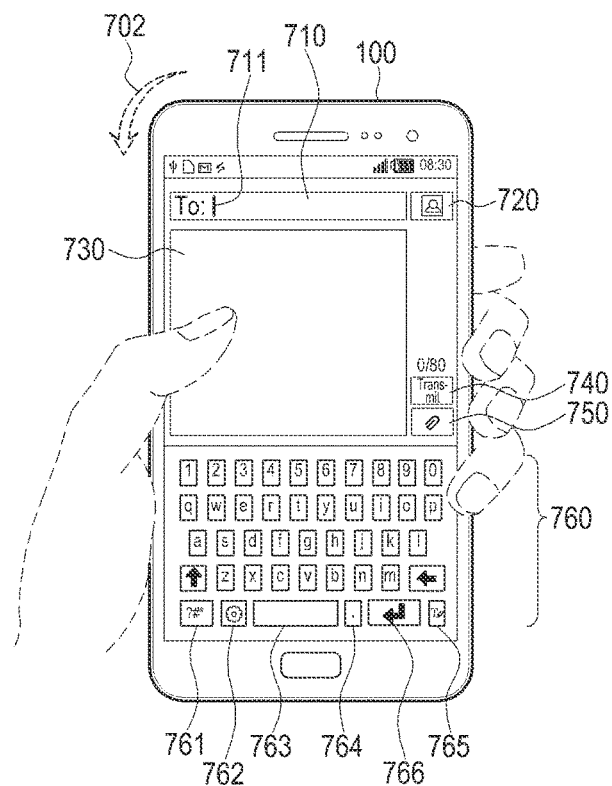
Figure 7F:
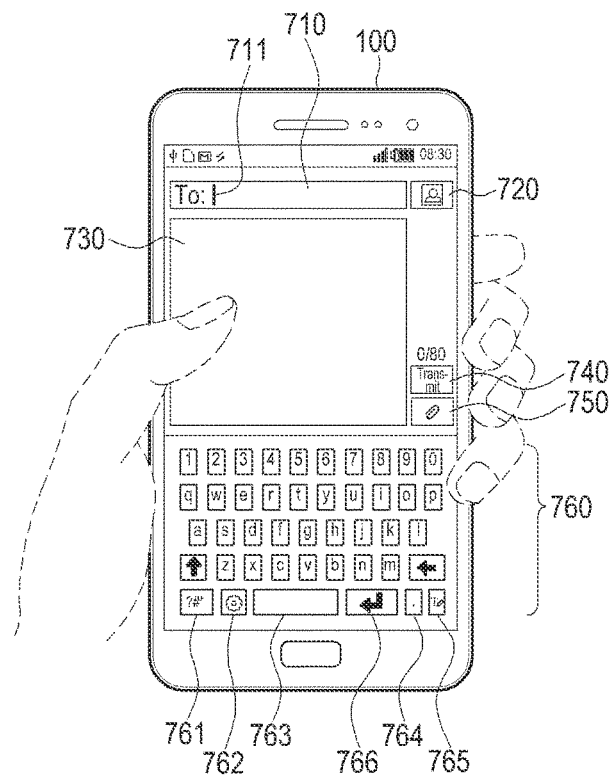

FIG. 7E is a conceptual view of a display apparatus according to an exemplary embodiment of the present invention. Referring to FIG. 7E, the user may again input an object position change command 702 corresponding to a position change in the left direction. The controller 110 may determine a position change direction and a position change degree of the input object position change command 702. The controller 110 may perform a control operation for displaying an object of a position change in such a manner as to change a position of the object of the position change based on the determined position change direction and the determined position change amount. For example, the controller 110 may perform a control operation for displaying the sixth text input sub-object 766 in such a manner as to move the sixth text input sub-object 766 by one step in the left direction as illustrated in FIG. 7F. After the second left input 702, the sixth text input sub-object 766 will have moved left two spots. Specifically, the controller 110 may perform a control operation for displaying the third layout of FIG. 7F.

Figure 7G:
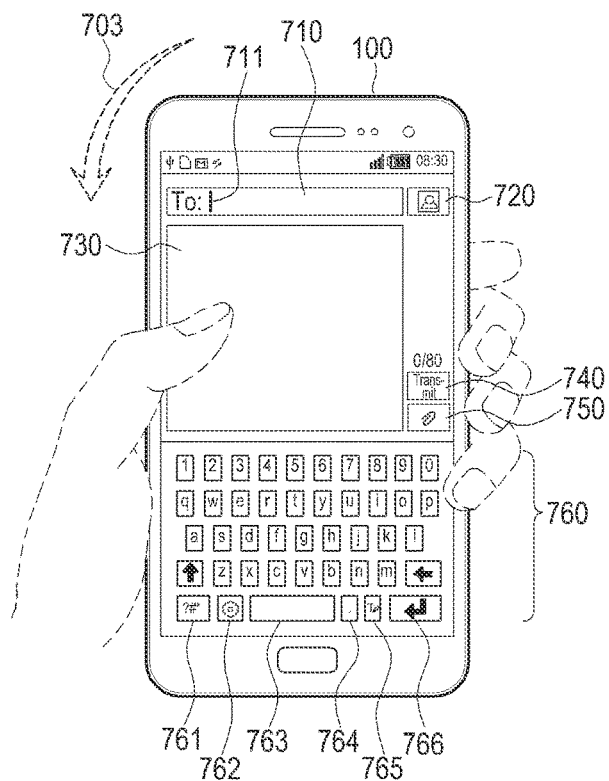

FIG. 7G is a view of a display apparatus according to an exemplary embodiment of the present invention. Referring to FIG. 7G, the user may again input an object position change command 703 corresponding to a position change in the left direction. The controller 110 may determine a position change direction and a position change degree or amount of the input object position change command 703. The controller 110 may perform a control operation for displaying an object of a position change in such a manner as to change a position of the object of the position change based on the determined position change direction and the determined position change amount. Meanwhile, a tilting angle and a rotating angle in the case of the object position change command 703 illustrated in FIG. 7G may be larger than those in the case of the object position change command 701 illustrated in FIG. 7B. An angular acceleration or an angular velocity in the case of the object position change command 703 illustrated in FIG. 7G may be larger than those in the case of the object position change command 701 illustrated in FIG. 7B. The controller 110 may determine that the position change amount in the case of FIG. 7G is larger than the position change degree in the case of FIG. 7B. In particular, the controller 110 may determine that the position change amount in the case of FIG. 7G is larger than a predetermined threshold or within a larger predetermined range. For example, the controller 110 may identify that the object position change command 701 corresponds to a position change of eight steps.

Figure 7H:
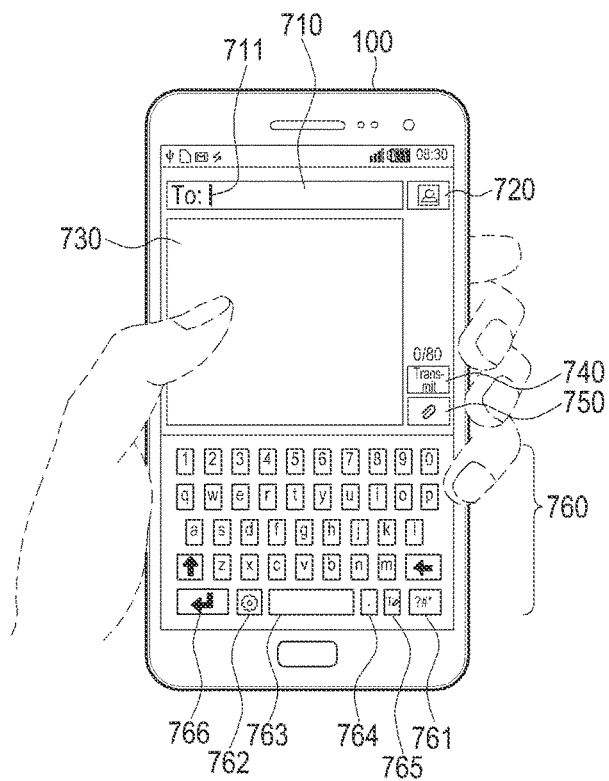

Accordingly, the controller 110 may perform a control operation for changing a position of the sixth text input sub-object 766 by eight steps and then displaying the sixth text input sub-object 766 subjected to the position change and the first text input sub-object 761 in such a manner as to exchange the position of the sixth text input sub-object 766 for that of the first text input sub-object 761. Specifically, the controller 110 may perform a control operation for displaying the ninth layout of FIG. 7H.

FIGS. 8A to 8D are views illustrating the movement of an object according to exemplary embodiments of the present invention.

Figure 8A:
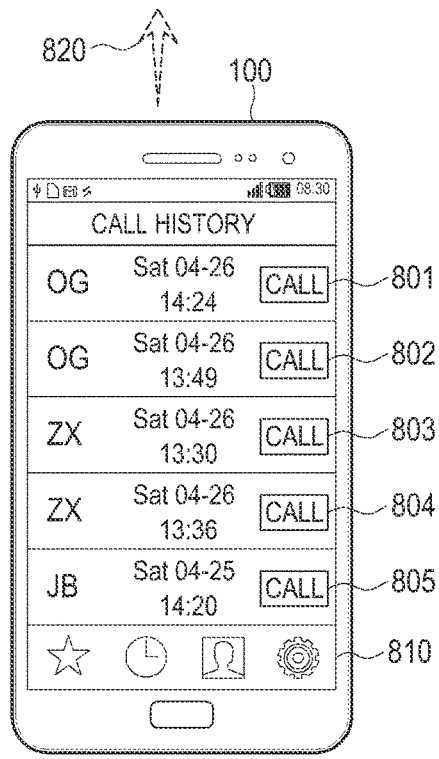
FIGS. 8A to 8D are views illustrating the movement of an object according to exemplary embodiments of the present invention.

Referring to FIG. 8A, the display apparatus 100 may execute a call log application, and may display a result of executing the call log application on the touch screen 190. The call log application may include call logs 801 to 805. The call log application may include, at a lower end part of the relevant screen, a menu tab 810 including function keys capable of accessing a bookmark, a call log, a telephone book and a setting screen. The call log application, for example, enables a menu tab 810 to be set to a default object of a position change and enables the menu tab 810 set to the default object of the position change to be stored.

The user may input an object position change command corresponding to a gesture 820 which applies tilting, rotating, or tab to an upper end of the display apparatus 100 in a backward direction.

Figure 8B:
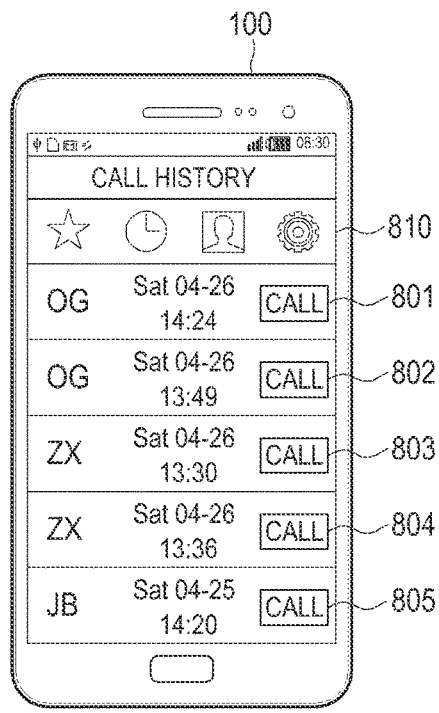

The controller 110 may analyze the object position change command, and may perform a control operation for displaying the object 810 of the position change (i.e., the menu tab 810) in such a manner as to move a position of the object 810 of the position change as illustrated in FIG. 8B. The controller 110, for example, may perform a control operation for displaying the object 810 of the position change at an upper end part of an application screen, namely, just below a title bar.

Figure 8C:
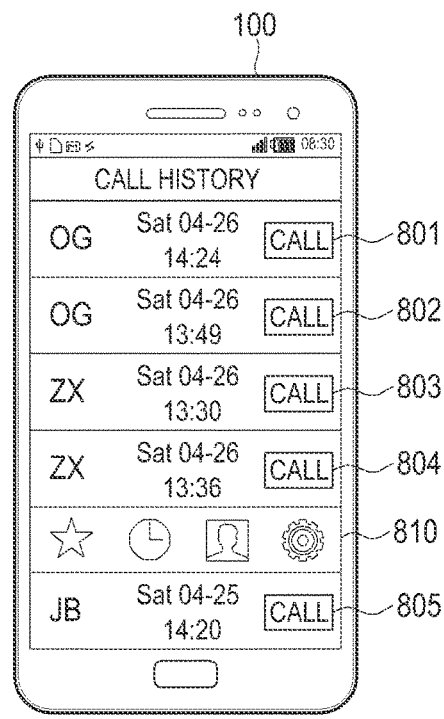

FIG. 8C is a view of a display apparatus according to an exemplary embodiment of the present invention. The controller 110 may perform a control operation for displaying the object 810 of the position change in such a manner as to move a position of the object 810 of the position change step by step as illustrated in FIG. 8C. The controller 110, for example, may perform a control operation for displaying the fifth object 805 and the object 810 of the position change in such a manner as to exchange a position of the fifth object 805 for that of the object 810 of the position change. As described above, the display apparatus 100 according to an exemplary embodiments of the present invention may not only exchange a position of an object at the left part of the application screen for that of an object at the right part thereof, but may also exchange a position of an object at the upper part of the application screen for that of an object at the lower part thereof.

Figure 8D:
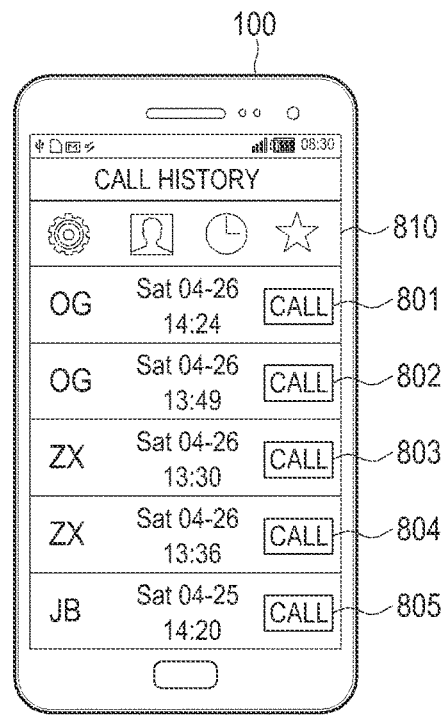

FIG. 8D is a view of a display apparatus according to an exemplary embodiment of the present invention. The controller 110 may perform a control operation for not changing a position of the object 810 of the position change but displaying sub-objects within the object 810 of the position change in such a manner as to invert positions of the sub-objects. This is comparable to the inversion of the positions of objects described above with regard to FIGS. 5H and 5I, and a detailed description thereof will not be repeated here.

It will be appreciated that the exemplary embodiments of the present invention may be implemented in the form of hardware, software, or a combination of hardware and software. Any such software will be encoded in a volatile or non-volatile non-transient physical storage device such as a ROM, or in a memory such as a RAM, a memory chip, a memory device or a memory integrated circuit, or in a storage medium, such as a Compact Disc (CD), a Digital Versatile Disc (DVD), a magnetic disk or a magnetic tape, which is optically or magnetically recordable and simultaneously, is readable by a machine (e.g., a computer), regardless of whether the software can be deleted or rewritten. It will be appreciated that the control method of the display apparatus which executes an application according to exemplary embodiments of the present invention may be implemented by a computer or a portable terminal including a controller and a memory, and that the memory is an example of a non-transient machine-readable storage medium suitable for encoding with a program or programs including instructions for implementing the exemplary embodiments of the present invention. Accordingly, exemplary embodiments of the present invention include any non-transient storage medium encoded with a program including codes for implementing an apparatus or a method which is claimed in any claim of this specification, and is readable by a machine (e.g., a computer).

Also, the display apparatus may receive and store the program from a device for providing a program, which is connected to the display apparatus by a wire or wirelessly. The device for providing a program may include: a memory for storing a program including instructions which cause the display apparatus to perform a previously-set control method of the display apparatus, information required for the control method of the display apparatus, and the like; a communication unit for performing wired or wireless communication with the display apparatus; and a controller for performing a control operation so as to transmit the relevant program to the display apparatus, at a request from the display apparatus or automatically.

The above-described exemplary embodiments of the present invention can provide the display apparatus capable of easily changing a position of an object on the touch screen by using simple motion input and the control method thereof. Therefore, even when an object that the user intends to touch is located away from the user's finger that is to be used for the touch in the case of grasping and operating the display apparatus with the user's single hand, the display apparatus allows the user to change the position of the object, so that the user can easily designate the object.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A control method of an electronic device which executes an application including at least one graphical object, the control method comprising:
    displaying an application execution screen including a plurality of objects on a touch screen of the electronic device;
    sensing, by a sensor, a first movement of the electronic device;
    determining that a direction of the first movement is a first direction;
    identifying a second object of the plurality of objects which is next to a first object of the plurality of objects based on the first direction; and
    exchanging a position of the first object with a position of the second object, in response to sensing the first movement while positions of objects other than the first object and the second object are maintained.

2. The control method as claimed in claim 1, wherein a number of the first object is plural.

3. The control method as claimed in claim 1, wherein the first movement of the electronic device comprises a gesture which applies tilting, rotating or tab to the electronic device in the first direction.

4. An electronic device which executes an application including at least one graphical object, the electronic device comprising:
    a touch screen configured to display an application execution screen including a plurality of objects;
    a sensor configured to sense a first movement of the electronic device; and
    a controller configured to:
        determine that a direction of the first movement is a first direction, identify a second object of the plurality of objects which is next to a first object of the plurality of objects based on the first direction, and
        control to exchange a position of the first object with a position of the second object in response to sensing the first movement while positions of objects other than the first object and the second object are maintained.

5. The electronic device as claimed in claim 4, wherein a number of the first object is plural.

6. The electronic device as claimed in claim 4, wherein the first movement of the electronic device comprises a gesture which applies tilting, rotating or tab to the electronic device in the first direction.

* * * * *